UNITED STATES PATENT OFFICE.

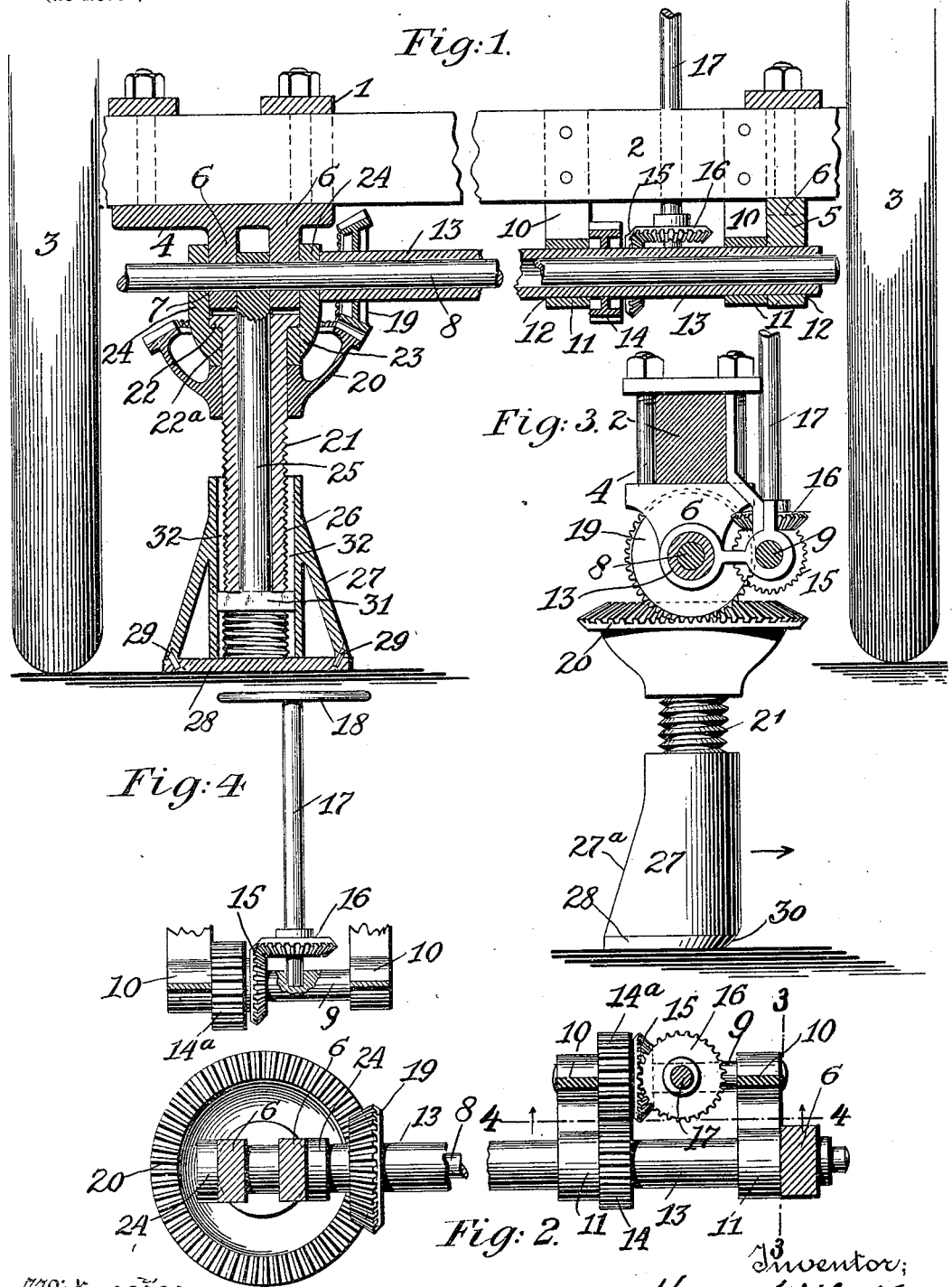

HENRY WILCKE, OF DETROIT, MICHIGAN, ASSIGNOR OF ONE-HALF TO JOHN ARTHUR ROBINSON, OF ARMLEY, ENGLAND.

STARTING MECHANISM FOR AUTOMOBILES.

SPECIFICATION forming part of Letters Patent No. 670,189, dated March 19, 1901.

Application filed July 30, 1900. Serial No. 25,274. (No model.)

*To all whom it may concern:*

Be it known that I, HENRY WILCKE, a subject of the Emperor of Germany, residing at Detroit, in the county of Wayne and State of Michigan, have invented certain new and useful Improvements in Starting Mechanism for Automobiles, of which the following is a specification.

My invention relates to apparatus or devices for use in connection with automobiles or other self-propelled vehicles or any propelled or drawn vehicles, the same being designed for use in assisting such vehicles in starting, so that the expenditure of power, which is necessarily much greater at the point of starting, will be minimized by its use; and the object of my invention is to produce an apparatus of this kind which will be simple and inexpensive in its construction, which will not be cumbersome or likely to get out of order, and which may be easily operated at a point at all times within easy reach of the driver or attendant.

My invention consists, substantially, of a device or apparatus suitably attached to and supported under the vehicle and means whereby said apparatus is operated to raise or lift the vehicle to a sufficient extent, so that its weight upon the running-gear may be wholly or partially relieved at the moment of starting, at which instant the vehicle will be lifted or thrust forward, as will be hereinafter fully described.

My invention further consists of the novel features of construction and arrangement of parts, all of which will be hereinafter more fully described, and particularly pointed out in the claims.

In the drawings, Figure 1 is a transverse sectional view of the lower part of an automobile or similar vehicle having my improved starting device attached to the axle thereof. Fig. 2 is a plan view taken on a horizontal plane below the axle. Fig. 3 is a sectional elevation thereof, taken on the line 3 3 of Fig. 2. Fig. 4 is a detail sectional view taken on the line 4 4 of Fig. 2.

Similar reference-numerals indicate corresponding parts in all the figures of the drawings.

Referring to the drawings, 1 designates the bottom of the automobile or other vehicle, and 2 one of the non-driving axles thereof, to which are applied the ordinary wheels 3, which support the same. To the axle 2 and preferably about midway of its length are secured clamps 4 and 5, both of which are provided with ears or projections 6, which are perforated, as at 7, to receive therein a horizontal shaft or spindle 8, the latter being preferably located directly beneath the axle 2, as shown.

9 designates a counter-shaft arranged parallel with the shaft or spindle 8 at one side thereof, the same being supported in brackets 10, secured to the axle 2, said brackets being provided with extensions 11, in which are formed openings 12, adapted to receive a sleeve 13, which is carried on the shaft or spindle 8, the latter having secured to it a gear-wheel 14, the teeth of which intermesh with the teeth of a similar gear 14$^a$, loosely mounted on the counter-shaft 9. A bevel-gear 15 is also fixed on the wheel 14$^a$, and both the wheel 14$^a$ and gear 15 revolve loosely on the shaft 9. A bevel-gear 16 is secured to the lower end of a vertical spindle 17, the upper end of which is supported in any convenient manner in the interior of the vehicle and is provided with a hand-wheel 18 or other similar device by which the operator or driver is enabled to actuate the sleeve 13 and the mechanism connected therewith, which I will now describe.

19 designates a bevel-gear secured to or made integral with the sleeve 13, the teeth of which engage the teeth of another bevel-gear 20, secured to a vertically-disposed hollow spindle 21, the upper extremity of said spindle being formed with an external flange or head 22, resting on a boss 23 and passing through an opening 22$^a$ in the boss, said boss being provided with upwardly-projecting perforated wings 24, through the perforations of which the spindle 8 passes, and by which means said boss and the depending spindle 21 are properly supported. The gear 20 is arranged just beneath the boss 23, whereby, in conjunction with the flange or head 22, resting upon the boss, the spindle 21 is retained against vertical movement. A rod 25 is inserted in the spindle 21, as shown, said rod being perforated at its upper extremity to receive the horizontal spindle or shaft 8 and resting between the adjacent ears or projections 6 of the clamp 4, from whence it extends downwardly through and to the bottom of the spindle 21.

The lower end portion of the spindle 21 for a portion of its length is threaded externally and screws into the internally-threaded socket 26 of a shoe 27, the latter being so adjusted with respect to the vehicle that its base 28 will normally rest a suitable distance above the level of the ground.

It will be noted that the shoe 27 is made, preferably, in two parts, the base 28 being secured by rivets or bolts, as at 29, or in any other suitable manner to the main portion, as shown; but in practice this construction may not be followed, as it is apparent that the shoe may be made in one piece, if desired. It will also be observed that the rear side portion of the shoe inclines downwardly and outwardly toward the base 28, as at 27$^a$, so that said portion will extend much farther beyond the vertical plane or line center of the spindle than the front side, and the front bottom portion of the base is beveled or cut under, as at 30, so that the inclination or tendency of said shoe will be to fall over in the direction in which the vehicle is to travel after it has been elevated from the ground, as described. The shoe is guided in its vertical travel upon the spindle 21 by a cross-head 31 at the lower end of the rod 25, which travels in diametrically opposite vertical grooves, as at 32, in the internally-threaded portion 26 of the shoe, by which construction and arrangement the shoe is prevented from turning upon the spindle 21. In this connection it will be noted that the rod 25 is retained in stationary position and that the spindle 21 turns upon said rod, while the shoe is retained against turning upon the spindle by the cross-head 31, but moves vertically with relation to the spindle, and that the spindle and rod 25 are pivotally mounted with respect to the vehicle.

The operation and advantage of my invention will be readily understood.

When it is desired to start the vehicle, the operator or attendant turns the hand-wheel 18 on spindle 17, which through the bevel-gears 15 and 16 and the gears 14 and 14$^a$ will cause the sleeve 13 to rotate, and through its attached bevel-gear 19 the bevel-gear 20 will be turned so as to rotate the spindle 21 and cause the shoe 27 to be projected downwardly thereon into contact with the ground to lift or raise the vehicle, as will be readily understood. The propelling mechanism of the vehicle will then be set in motion and the vehicle will be thrust forward, the shoe and attached spindle 21 acting as a lever therefor, with the ground as its fulcrum. The shoe may then be raised to normal position by operation of the controlling mechanism.

From the foregoing it will be apparent that my invention provides in an exceedingly simple and inexpensive manner a device or apparatus for assisting in starting self-propelled and all kinds of vehicles and which is particularly well adapted for the purposes intended. The parts are so constructed and arranged as to be quickly and easily adjusted, so that the shoe may be caused to contact with the ground more or less quickly and the vehicle raised to any predetermined height, so that the non-driving wheels may be relieved more or less of the superincumbent weight thereon, which in such places where the ground is soft or uneven or where the weight upon the non-driving wheels is very great effects a marked economy in the expenditure of the motive power or energy used to propel the vehicle, and at the same time the vehicle will be assisted in effectually gaining the required speed at the very beginning of its travel.

It is manifest that various modifications may be made in the details of construction and arrangement involved in my improved starting mechanism and that the same may be adapted for use effectually in connection with tram-cars or other like vehicles, and I reserve the right to all such alterations, additions, and changes therein as properly fall within the spirit and scope of my invention and improvements and the terms of the following claims.

Having thus described my invention, I claim and desire to secure by Letters Patent—

1. A device or apparatus for assisting in starting self-propelled and other vehicles, comprising a shoe attached to and supported beneath said vehicle, a supplemental member in operative screw-threaded connection therewith, said shoe and said supplemental member embodying one a spindle and the other a socket for the spindle, and means for relatively adjusting said shoe and said supplemental member whereby the shoe is thrown into or out of operative contact with the ground.

2. A device or apparatus for assisting in starting self-propelled and other vehicles, comprising a shoe attached to and supported beneath said vehicle and provided with a threaded socket, a threaded spindle adapted to said socket, and means connecting with said spindle and with the interior of the vehicle whereby the shoe is adjusted to throw it into or out of operative contact with the ground.

3. A device or apparatus for assisting in starting self-propelled and other vehicles, comprising a shoe having a threaded socket, a threaded spindle adapted to said socket and pivotally attached to and supported underneath the vehicle, and means connecting with said spindle and with the interior of the vehicle whereby the spindle is turned to throw said shoe into or out of operative contact with the ground.

4. A device or apparatus for assisting in starting self-propelled and other vehicles, comprising a shoe having a threaded socket, a threaded spindle adapted to said socket and having a bevel-gear secured thereto, a boss adapted to engage said spindle and supported on a spindle carried by the vehicle, a bevel-gear meshing with the bevel-gear on the spindle, and means connected therewith and communicating with the interior of the vehicle whereby rotation is given to said gears and spindle and the shoe thereby moved into or out of operative contact with the ground.

5. A device or apparatus for assisting in starting self-propelled and other vehicles, comprising a shoe adjustably supported on a spindle pivotally secured to the vehicle, a bevel-gear secured to said spindle the teeth of which engage the teeth of another bevel-gear rotatively supported, and means for giving rotation to said gears whereby said spindle is rotated to move the shoe into or out of operative contact with the ground.

6. A device or apparatus for assisting in starting self-propelled and other vehicles, comprising a shoe adjustably secured to a spindle and adapted to move thereon, a rod adapted to the bore in said spindle and pivotally held on a spindle supported by the vehicle, means for holding said first spindle upon said rod and permitting it to rotate thereon, and means connecting with said first spindle and communicating with the interior of the vehicle whereby rotation is given thereto and the shoe thereby moved into or out of operative contact with the ground.

7. A device or apparatus for assisting in starting self-propelled and other vehicles, comprising a shoe adjustably secured to a spindle, said spindle being pivotally supported from said vehicle, a bevel-gear secured to said spindle and meshing with a bevel-gear mounted upon a sleeve carried by a shaft, a gear-wheel mounted upon said sleeve and meshing with a gear-wheel carried by a counter-shaft, and means for giving rotation to said gear-wheels, whereby the parts are moved to bring the shoe into or out of operative contact with the ground.

8. A device or apparatus for assisting in starting self-propelled and other vehicles, comprising a shoe adjustably secured to a spindle, a bevel-gear carried on said spindle, a shaft supported by said vehicle and to which said spindle is pivotally connected, a sleeve mounted on said shaft and having a bevel-gear adapted to mesh with the bevel-gear carried by said spindle, a gear-wheel mounted on said sleeve and adapted to mesh with gear mechanism mounted on a suitably-connected counter-shaft, gear mechanism meshing with said gear mechanism on the counter-shaft, and mounted on a spindle leading to the interior of the vehicle and by which the parts are moved to bring said shoe into or out of operative contact with the ground.

In testimony whereof I have signed my name in the presence of the subscribing witnesses.

HENRY WILCKE.

Witnesses:
J. R. LITTELL,
JOHN M. HOCTOR.